United States Patent
Du et al.

(10) Patent No.: US 9,018,830 B2
(45) Date of Patent: Apr. 28, 2015

(54) STRONTIUM PHOSPHOR BLENDS HAVING HIGH CRI

(75) Inventors: Fangming Du, Northfield, OH (US); William Winder Beers, Chesterland, OH (US); Jon Bennett Jansma, Pepper Pike, OH (US); William Erwin Cohen, Solon, OH (US)

(73) Assignee: General Electric Company, Schenectady, NY (US)

( * ) Notice: Subject to any disclaimer, the term of this patent is extended or adjusted under 35 U.S.C. 154(b) by 844 days.

(21) Appl. No.: 13/247,350

(22) Filed: Sep. 28, 2011

(65) Prior Publication Data

US 2013/0076228 A1   Mar. 28, 2013

(51) Int. Cl.
| | |
|---|---|
| H01J 1/62 | (2006.01) |
| H01J 63/04 | (2006.01) |
| C09K 11/71 | (2006.01) |
| C09K 11/76 | (2006.01) |
| C09K 11/77 | (2006.01) |
| H01J 61/44 | (2006.01) |
| H01J 61/35 | (2006.01) |

(52) U.S. Cl.
CPC ................ *C09K 11/71* (2013.01); *C09K 11/76* (2013.01); *C09K 11/7734* (2013.01); *H01J 61/44* (2013.01); *H01J 61/35* (2013.01)

(58) Field of Classification Search
CPC ........... H01J 61/44; H01J 61/48; H01J 61/72; H01J 1/63; H01J 61/35; H01J 61/16; H01J 29/20; C09K 11/73; C09K 11/7734; C09K 11/7777; C09K 11/7786; C09K 11/7739; C09K 11/7787; C09K 11/595; C09K 11/663; C09K 11/701; C09K 11/778; C09K 11/71; C09K 11/7478; C09K 11/76; C09K 11/7774
USPC ........ 313/484, 485, 486, 487, 499, 635, 637, 313/639, 640; 252/301.4 R, 301.6 P, 301.35
See application file for complete search history.

(56) References Cited

U.S. PATENT DOCUMENTS

| | | | |
|---|---|---|---|
| 6,137,217 | A | 10/2000 | Pappalardo et al. |
| 6,525,460 | B1 | 2/2003 | Soules et al. |

(Continued)

FOREIGN PATENT DOCUMENTS

WO    WO 2008/055769 A2    5/2008

OTHER PUBLICATIONS

PCT Search Report and Written Opinion dated Feb. 8, 2013 from corresponding Application No. PCT/US2012/053295.

Primary Examiner — Nimeshkumar Patel
Assistant Examiner — Kevin Quarterman
(74) Attorney, Agent, or Firm — Fay Sharpe LLP

(57) ABSTRACT

A fluorescent lamp is provided including a phosphor blend comprising less than about 10% by weight rare earth phosphor, based on the total weight of the phosphor composition. This phosphor blend, when coated on a lamp, provides a lamp that exhibits high color rendering index (CRI), of at least 87, while simultaneously achieving low CCT, of less than about 4500K, i.e. of between about 3000K and 4500K. The phosphor system provided includes a non-rare earth strontium red broad band phosphor, a non-rare earth blue broad band halophosphor, and a rare earth-doped green-blue emitting phosphor, more specifically, a combination of SAR and blue-halo non-rare earth phosphors, and less than 20 wt % BAMn phosphor, based on the total weight of the phosphor system.

19 Claims, 2 Drawing Sheets

(56) References Cited

U.S. PATENT DOCUMENTS

| | | |
|---|---|---|
| 7,119,488 B2 | 10/2006 | Soules et al. |
| 2003/0155857 A1* | 8/2003 | Soules et al. .................. 313/487 |
| 2004/0113538 A1* | 6/2004 | Srivastava et al. ............ 313/486 |
| 2007/0170834 A1 | 7/2007 | Jansma |
| 2009/0102348 A1* | 4/2009 | Beers et al. .................... 313/487 |
| 2009/0213584 A1* | 8/2009 | Jansma ........................ 362/225 |
| 2013/0076227 A1* | 3/2013 | Cohen et al. .................. 313/486 |

* cited by examiner

STRONTIUM PHOSPHOR BLENDS HAVING HIGH CRI

BACKGROUND OF THE DISCLOSURE

The present invention relates to phosphor compositions, particularly phosphor compositions for use in fluorescent lamps. More particularly, the present invention relates to improving the CRI of a fluorescent lamp by providing an optimized phosphor blend including a limited amount, up to only 20% by weight of the phosphor, of rare earth phosphor in combination with other broad band phosphors for use therein.

Fluorescent lamps typically have a transparent glass envelope enclosing a sealed discharge space containing an inert gas and mercury vapor. When subjected to a current provided by electrodes, the mercury ionizes to produce radiation having primary wavelengths of 185 nm and 254 nm. This ultraviolet radiation, in turn, excites phosphors on the inside surface of the envelope to produce visible light which is emitted through the glass.

Generally, a fluorescent lamp for illumination uses a phosphor which absorbs the 254 nm Hg-resonance wave and is activated to convert the ultraviolet luminescence of mercury vapor into visible light. Conventionally, a white-emitting calcium halophosphate phosphor, such as $Ca_{10}(PO_4)_6(F,Cl)_2$: Sb,Mn, has been used to convert the UV light to white light. More recently, in order to improve the color-rendering properties and emission output of fluorescent lamps, a three-band type fluorescent lamp, which employs a mixture of red, green, and blue-emitting phosphors, has been used to render illumination of a white color. For example, the phosphor may include a mixture of europium-activated barium magnesium aluminate phosphor $(BaMg_2Al_{16}O_{27}:Eu^{2+})$ for the blue-emitting phosphor, cerium and terbium-activated magnesium aluminate phosphor $(Ce, Tb)MgAl_{11}O_{19}$ for the green-emitting phosphor, and europium-activated yttrium oxide phosphor $(Y_2O_3:Eu^{3+})$ for the red-emitting phosphor, mixed in an adequate ratio. The combined spectral output of such a phosphor blend produces a white light.

The apparent, or perceived, color of a light source is described in terms of color temperature which is the temperature of a black body that emits radiation of about the same chromaticity as the radiation considered. A light source having a color temperature of 3000 Kelvin, i.e. 3000K, has a larger red component than a light source having a color temperature of 4100K. The color temperature of a lamp using a phosphor blend can be varied by changing the ratio and composition of the phosphors.

Color quality is further described in terms of color rendering, and more particularly color rendering index (CRI or $R_a$), which is a measure of the degree to which the psycho-physical colors of objects illuminated by a light source conform to those of a reference illuminant for specified conditions. CRI is in effect a measure of how well the spectral distribution of a light source compares with that of an incandescent (blackbody) source, which has a Planckian distribution between the infrared (over 700 nm) and the ultraviolet (under 400 nm), i.e. in the visible portion of the spectrum. The discrete spectra which characterize phosphor blends will yield good color rendering of objects whose colors match the spectral peaks, but not as good for objects whose colors lie between the spectral peaks. Lamp CRI can be improved by using an appropriate combination of rare earth phosphors or by using phosphors emitting broadband spectral distribution.

The color appearance of a lamp is described by its chromaticity coordinates which can be calculated from the spectral power distribution according to standard methods. See CIE, *Method of measuring and specifying color rendering properties of light sources* (2nd ed.), Publ. CIE No. 13.2 (TC-3, 2), Bureau Central de la CIE, Paris, 1974. The CIE standard chromaticity diagram includes the color points of black body radiators at various temperatures. The locus of black body chromaticities on the x,y-diagram is known as the Planckian locus. Any light emitting source represented by a point on this locus may be specified by a color temperature. A point near but not on this Planckian locus has a correlated color temperature (CCT) because lines can be drawn from such points to intersect the Planckian locus at this color temperature such that all points on a given line look to the average human eye as having nearly the same color. Luminous efficacy of a source of light is the quotient of the total luminous flux emitted by the total lamp power input as expressed in lumens per watt (LPW or lm/W).

Spectral blending studies have shown that the LPW and CRI of white light sources are dependent upon the spectral distribution of the individual color phosphors. It is expected that such phosphors preserve structural integrity during extended lamp operation such that the phosphors remain chemically stable over a period of time while maintaining stable CIE color coordinates of the lamp. The human eye does not have the same sensitivity to all visible light wavelengths. Rather, light with the same intensity but different wavelengths will be perceived as having different luminosity. The use of tri-phosphor blends has led to improvements in color rendering as compared to single phosphor lamps.

For example, US Pub. App. 2007/0170834, published on Jul. 26, 2007 and sharing a common inventor herewith, discloses a phosphor blend including a strontium rare earth phosphor $(Sr_4Al_{14}O_{25}: Eu^{2+})$ that achieves a CRI of 90+, at a low CCT. However, the rare earth content of this phosphor blend is over 40% by total weight of the phosphor composition. Because rare earth phosphors can be expensive to use, attempts have been made to achieve high CRI and yet reduce the rare earth phosphor content so that the lamp can be made more economically. Such attempts have been successful only in lamps that exhibit a very high CCT, in excess of 5000K. Thus, a trade-off must be made between reducing the cost of the phosphor and maintaining a low CCT.

Therefore, a need exists for a phosphor blend that provides CRI of at least 87 or better, while at the same time achieving low CCT, below about 4500K, and that is more economically feasible. The use of a phosphor blend including only up to about 20% rare earth phosphor in combination with certain non-rare earth broad band phosphors in accord herewith provides a lighting solution having improved CRI while maintaining a low operating CCT, that can be manufactured at lower cost due to the reduction in the amount of rare earth phosphor included in the phosphor blend.

SUMMARY OF THE DISCLOSURE

A fluorescent lamp is provided including a phosphor blend comprising less than about 10% by weight of rare earth phosphor, based on the weight of the total phosphor composition, in combination with broad band non-rare earth phosphors. This phosphor blend, when coated on a lamp, provides a lamp that exhibits high color rendering index (CRI), of at least 87, while simultaneously achieving low CCT, of less than about 4500K, i.e. of between about 3000K and 4500K. The phosphor system provided includes a strontium red non-rare earth red emitting broad band phosphor, a blue halo, non-rare earth, blue emitting broad band phosphor, and a rare earth-doped green-blue emitting phosphor.

In one embodiment, the phosphor system includes 80% or more non-rare earth phosphor content and only up to about 20% or less of green-blue emitting rare earth phosphor content, and preferably only up to about 10% or less of green-blue emitting rare earth phosphor content. For example, the phosphor blend suitable for use in accord with an embodiment of the invention includes strontium red and blue-halo broadband emitting phosphors in combination with less than 20% by weight of the total phosphor content of green-blue emitting rare earth phosphor. More specifically, the phosphor system may include, for example, SR, a red emitting non-rare earth tin doped strontium phosphate ($Sr_3(PO_4)_2:Sn^{2+}$), a non-rare earth manganese-free blue emitting halophosphor ($Ca_5F(PO_4)_3:Sb$), and BAMn, a rare earth europium manganese-doped barium magnesium aluminate ($BaMgAl_{10}O_{17}:Eu^{2+}, Mn^{2+}$). In one embodiment, the phosphor system comprises SR (84.2 wt %), blue halophosphor (10 wt %), and BAMn (5.8 wt %), based on the total weight of the phosphor system. In another embodiment, the phosphor system comprises SR (74.9 wt %), blue halophosphor (19.1 wt %), and BAMn (6.0 wt %), based on the total weight of the phosphor system.

The phosphor system may be provided as a single layer, disposed on the inner surface of the discharge chamber of a lamp. The single layer coating comprises a mixture of a non-rare earth red emitting phosphor, a non-rare earth blue emitting phosphor, and a rare earth green-blue emitting phosphor. Alternatively, the phosphor system may be provided as part of a multi-layer coating.

An advantage of the phosphor blend provided herein is that the lamp including such phosphor blend exhibits high CRI of 87 or better, a CCT of less than about 4500K, for example a CCT of between about 3000K and 4500K, and includes less than 20 wt % of rare earth phosphor, i.e. less than about 10 wt % of rare earth phosphor, based on the total weight of the phosphor system.

A further advantage of the phosphor blend provided herein is the reduced cost of the phosphor blend due to the reduction in rare earth phosphor content.

These and other advantages and benefits of the novel phosphor system provided herein will become apparent upon reading and understanding the disclosure that follows.

DETAILED DESCRIPTION OF THE PREFERRED EMBODIMENTS

The present disclosure relates to phosphor compositions and to the use thereof in a discharge lamp. In one embodiment, a fluorescent lamp including the phosphor system provided herein exhibits high color rendering index (CRI), of at least 87, while simultaneously achieving low CCT, below about 4500K. The phosphor system includes a rare earth phosphor, as less than about 20 wt %, i.e. less than about 10 wt %, of the total phosphor system, in combination with non-rare earth broad band phosphors, for example a strontium red emitting broad band phosphor, and a blue emitting blue-halo broad band phosphor.

In one embodiment, the phosphor system is provided as a single layer, disposed on the inner surface of the discharge chamber of a lamp. The layer comprises a mixture of a non-rare earth strontium red emitting phosphor, a non-rare earth blue-halo phosphor, and a green-blue emitting rare earth phosphor.

The coating system may be provided for use on an inner surface of the discharge chamber or tube of a fluorescent lamp, whether linear, U-shaped, or otherwise configured. For example, the coating described herein may be used in a standard T8 or T12 lamp configuration, as known in the art, and as more fully described in US Pub. App. 2007-0170834 to our common assignee, incorporated herein by reference. One skilled in the art however will understand that the phosphor coating system provided herein has use beyond just the named linear formats, to all lighting solutions relying on a phosphor coating to convert light energy to visible white light for emission.

Figure 1:
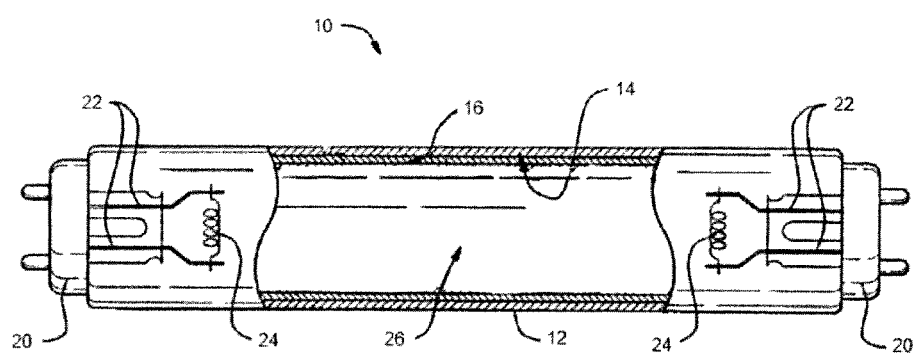
FIG. 1 is a schematic cross-section of a fluorescent lamp having a phosphor layer in accord with the invention.

Referring to FIG. 1, there is depicted a representative fluorescent lamp 10 comprising an elongated silicate glass envelope 12 having a circular cross-section. The low pressure mercury discharge assembly in said lamp includes a pair of spaced conventional electrode structures 24 at each end connected to electrical contacts 22 fed through a base 20 fixed at both ends of the sealed glass envelope. The discharge-sustaining fill 26 is disposed within the sealed glass envelope and comprises an inert gas, such as argon, krypton, or a mixture thereof, at a low pressure, in combination with a small quantity of mercury to provide the low vapor pressure manner of lamp operation. Deposited on the inner surface of the glass envelope is phosphor blend layer 16, including a blend of phosphors in accord herewith.

In one embodiment of the invention, the lamp 10 may further include a second layer of material 14 positioned between the phosphor blend layer 16 and the inner surface of the glass envelope 12. This second layer can be an ultraviolet reflecting barrier layer as is known in the art, for example as taught in U.S. Pat. No. 5,602,444, and may comprise, a mixture of alpha- and gamma-alumina particles.

The single layer phosphor coating 16 can be formed by any procedure for applying a coating as known to those skilled in the art. As such, the manner of applying the single layer coating is not a limiting factor of the invention. For example, the phosphor can be deposited on the inner glass surface of the discharge tube from a conventional aqueous suspension including various organic binders and adherence promoting agents. The aqueous suspension is applied and then dried in the conventional manner. Another suitable option for applying the coating is by electrostatic deposition techniques.

The phosphors for use in the present invention may be made by any conventional method known to those skilled in the art for preparing such materials, such as that described, for example, in U.S. Pat. No. 7,119,488, sharing at least one common inventor herewith. For example, a ceramic powder method, such as a liquid phase (flux) method or a solid state method may be employed. In these methods, the preferred starting phosphor compounds comprise oxides, carbonates, hydroxides, nitrates or oxalates of the metal constituents, although other starting materials may be used. Notwithstanding the foregoing, it will be appreciated that the method of preparing the phosphor materials is not a limiting factor of the present invention.

The inventors have found that it is possible to further improve the efficacy of current lighting sources utilizing phosphor emissions by developing the phosphor blend to provide higher CRI at a lower CCT, and further by reducing the rare earth phosphor content. For convenience, the discussion and examples described herein refer to the use of the phosphor blend of the present invention in Hg-based fluorescent lamps. However, it should be recognized that the inventive concepts include applications relating to other light sources incorporating phosphors as well, including but not limited to white LED's, xenon based discharge lamps, and plasma display panels.

In one embodiment of the present invention, a phosphor blend for use in a light source having a color rendering index of at least about 87 or better is provided. Specifically, the phosphor blend provided comprises a combination of a rare earth phosphor and other broad band phosphors. More specifically, the optimized phosphor blend includes a red emitting, non-rare earth broad band phosphor, a blue emitting, non-rare earth broad band phosphor, and a green-blue emitting, rare earth phosphor, only the green-blue emitting phosphor being a rare earth-doped phosphor. The phosphor blend contains at least 80% by weight, i.e. at least 90% by weight, based on the total weight of the phosphor composition, of non-rare earth phosphors.

The above-described phosphor system will result in improved CRI at lower CCT over conventional phosphor blends because of the combination of rare earth green-blue phosphor with the other specific broad band phosphor identified. The correlated color temperature (CCT) of the blend, which is determined based on the mass fraction of each phosphor in the system, may range from about 3000K to about 4500K.

The relative proportions of the individual phosphors in the present phosphor blends are such that when blended, their emission will produce visible white light of predetermined CCT value between 3000K and 4500K, and further exhibit a CRI of at least about 87. A lamp having the phosphor blend in accord herewith will exhibit improved CRI as compared to conventional lamps having tri-phosphor component blends consisting of red and blue phosphors but lacking the combination of the green-blue rare earth phosphor specified herein, i.e. BAMn, in combination with the specified non-rare earth broad band phosphors. The relative amounts of each phosphor component in the phosphor system can be described in terms of weight percent, with weight percent of all the individual phosphors adding up to 1.0. Although not intended to be limiting, the phosphor blend of the present invention may generally contain from about 70 wt % to about 90 wt %, i.e. from about 72 wt % to about 85 wt %, of a strontium red non-rare earth phosphor, from about 5 wt % to about 25 wt %, i.e. from about 10 wt % to about 20 wt % of a non-rare earth blue halophosphor, and from about 1 wt % to about 20 wt %, i.e. from about 5 wt % to about 8 wt %, of a green-blue rare earth phosphor. In one embodiment, the phosphor system comprises 84.2 wt % SR broad band phosphor, 10 wt % blue broad band halophosphor, and 5.8 wt % BAMn rare earth green-blue phosphor. In another embodiment, the phosphor system comprises 74.9 wt % SR broad band phosphor, 19.1 wt % blue broad band halophosphor, and 6.0 wt % BAMn rare earth green-blue phosphor.

The following examples are provided to enable those skilled in the art to more clearly understand and practice the invention. The invention is in no way intended to be limited to the examples.

EXAMPLES

Phosphor blends in accord with an embodiment of the invention are set forth in TABLE 1 below. As can be seen, the blends are shown with respect to CCT, i.e., phosphor blend A relates to a CCT of 3500K, and blends B-D relate to a CCT of 4100K. Blends A and B are representative of phosphor systems are in accord with the invention, while blends C and D are not in accord with the invention. Each of blends C and D contain well above 10 wt % rare earth phosphor, i.e. lamp blend C contains 55.8 wt % rare earth phosphor content and lamp blend D contains 100 wt % rare earth phosphor. Rare earth phosphor components are denoted by an asterisk (*) in Table 1. All data provided in Table 1 represents an average of multiple identical lamps, i.e., the lamp data for any one of Blend A-D is the result of testing conducted on multiple lamps of the same T8F32 lamp configuration with the same phosphor system. In addition, all lamps tested were of identical T8F32 lamp configuration, with only the phosphor blend being different. Based on the testing of the multiple lamps, average LPW and CRI values were determined for each phosphor blend, A, B, C, and D, at the recorded CCT, with all other lamp parameters being held constant.

TABLE 1

| BLEND | COMPOSITION | WEIGHT % RARE EARTH (phosphor) | LPW | CRI | CCT |
|---|---|---|---|---|---|
| A | SR (84.2 wt %)<br>Blue-Halo (10.0 wt %)<br>BAMn (5.8 wt %)* | 5.8 wt % | 48 | 88.0 | 3500K |
| B | SR (74.9 wt %)<br>Blu-Halo (19.1 wt %)<br>BAMn (6.0 wt %)* | 6.0 wt % | 50 | 88.5 | 4100K |
| C | CBM (30.1 wt %)*<br>Halo (42.4 wt %)<br>SAE (25.7 wt %)*<br>$Zn_2SiO_4$ (1.8 wt %) | 55.8 wt % | 54.8 | 92.0 | 4100K |
| D | YEO (48.0 wt %)*<br>LAP (41.5 wt %)*<br>BAM (8.8 wt %)*<br>BAMn (1.8 wt %)* | 100 wt % | 86.3 | 87.6 | 4100K |

In the foregoing TABLE 1, the phosphors shown are the following:

| | |
|---|---|
| SR | $Sr_3(PO_4)_2:Sn^{2+}$ |
| SAE | $Sr_4Al_{14}O_{25}:Eu^{2+}$ |
| BAMn | $BaMgAl_{10}O_{17}:Eu^{2+}, Mn^{2+}$ |
| Blue-Halo | $Ca_5F(PO_4)_3:Sb$ |
| CBM | $GdMgB_5O_{10}:Ce^{3+}, Mn^{2+}$ |
| YEO | $Y_2O_3:Eu^{2+}$ |
| LAP | $LaPO_4:Ce^{3+}, Tb^{3+}$ |
| BAM | $BaMgAl_{10}O_{17}:Eu^{2+}$ |

As shown, a lamp exhibiting CRI of at least 87 was achieved, even though only less than 10 wt % rare earth phosphor was used. Further, with reference to lamps B, C, and D, all of which exhibit a CCT of 4100K, lamp B, having a rare earth phosphor content of less than 10 wt % in combination with the specified broad band non-rare earth phosphors in accord herewith, exhibits CRI comparable to that exhibited by conventional lamps C and D which have rare earth phosphor content of 50% or more, and therefore are much more expensive to produce. Lamps A and B show that a lamp in accord with at least one embodiment of the invention can achieve a higher CRI, of 87 or above, while at the same time having a CCT not more than 4100K.

Figure 2:
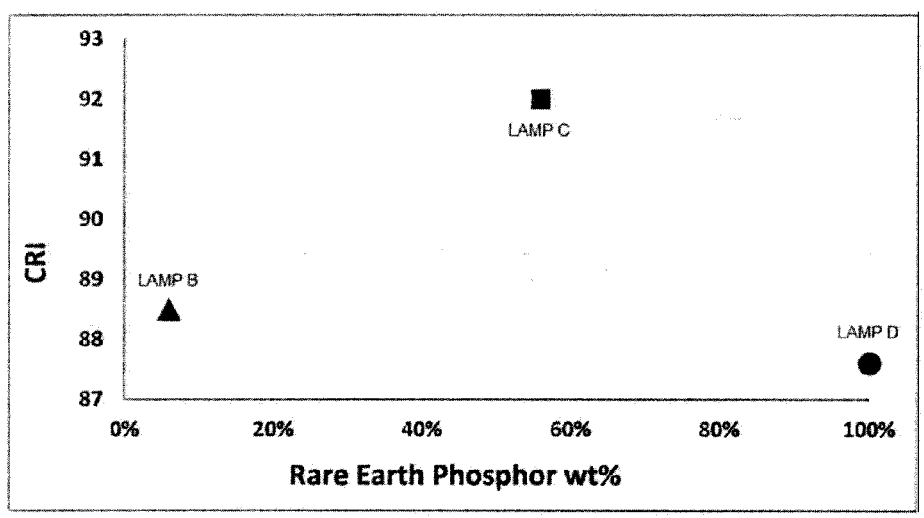
FIG. 2 is a graph showing CRI and % rare earth phosphor content.

FIG. 2 provides a graph of the foregoing data. Specifically, the graph shows the CRI data for lamps B, C, and D of Table 1. All three lamps have a CCT of 4100K. As can be seen, Lamp B, in accord with the invention, exhibits a CRI of 88.5 while containing only 6.0 wt % rare earth phosphor content. Lamp C exhibits a higher CRI, of 92.0, but contains 55.8 wt % rare earth phosphor content, making this lamp more expensive to produce. Lamp D, having 100% rare earth phosphor content would be very expensive to produce and exhibits a CRI of 87.6, less than that of Lamp B.

In light of the foregoing, it has been shown that the phosphor blend in accord with the invention, provided on a fluorescent lamp as a single layer coating, is a viable solution for achieving high CRI, in excess of about 87, and a low CCT, of less than 4500K, and preferably only 4100K, while reducing the amount of rare earth phosphor to less than 20 wt %, and preferably less than about 10 wt %, and providing a correlative price decrease.

The phosphor blend described above may be used in many different applications. For example, the material may be used as a phosphor in a lamp, in a cathode ray tube, in a plasma display device or in a liquid crystal display. The material may also be used as a scintillator in an electromagnetic calorimeter, in a gamma ray camera, in a computed tomography scanner, or in a laser. These uses are meant to be merely exemplary and not exhaustive. In a preferred embodiment, the phosphor is used in a fluorescent light, as described above.

Additional additives may be included in the phosphor blend and can include a dispersion vehicle, a binder, and one or more of various known non-luminescent additives, including, e.g., alumina, calcium phosphate, thickeners, dispersing agents, and certain borate compounds as are known in the art.

Any known technique may be used for depositing the phosphor coating. As such, the manner of deposition itself is not a limiting factor of the invention. Without intending to be bound in any way, one technique which may be used includes blending the various phosphor powders by weight, dispersing the blended powders in a water based system, which may contain other additives as are known in the art, including for example adherence promoters, such as hydroxyethylcellulose or fine non-luminescent particles of alumina or calcium pyrophosphate, dispersing agent(s), and thickener(s), for example polyethylene oxide. In this type of method, the suspension is then typically diluted with deionized water until it is suitable for producing a coating of the desired thickness or coating weight, and then applied to the inside of the glass tube and dried in accord with conventional coating techniques known in the art. Optionally, after the first thin coat or layer is applied, additionally desired thin coats or layers may be applied. The thin layer, or layers if more than one is applied, has a thickness sufficient to absorb substantially all of the UV light produced by the arc. Another suitable option for applying the coating is by known electrostatic deposition techniques.

While the invention has been described in detail and with reference to specific embodiments thereof, it will be apparent to one skilled in the art that various changes and modifications can be made therein without departing from the spirit and scope of the invention. For example, the phosphor blend of the present invention can be used in a compact fluorescent lamp arrangement, which may be helical in nature or have another compact configuration.

Having thus described the invention, it is now claimed:

1. A lamp comprising:
   a lamp envelope enclosing a discharge space and having an inner surface;
   an ionizable medium within said lamp envelope comprising mercury and an inert gas;
   first and second electrodes; and
   a phosphor blend disposed on said inner surface, said blend comprising at least 80% non-rare earth broad band phosphors, based on the total weight percent of the phosphor blend, including: from about 70 wt % to about 90 wt % of a non-rare earth red phosphor, from about 5 wt % to about 25 wt % of a non-rare earth blue phosphor, and from about 1 wt % to 20 wt % of a rare earth green-blue phosphor, wherein said lamp simultaneously exhibits a CRI of at least 87 and a CCT of not more than 4500K.

2. A lamp according to claim 1, wherein the non-rare earth red phosphor is a strontium red broad band phosphor, and wherein the non-rare earth blue phosphor is a blue broad band halophosphor.

3. A lamp according to claim 2, wherein the non-rare earth red phosphor is $Sr_3(PO_4)_2:Sn^{2+}$, wherein the non-rare earth blue phosphor is $Ca_5F(PO_4)_3:Sb$, and wherein the rare earth green-blue phosphor is $BaMgAl_{10}O_{17}:Eu^{2+}, Mn^{2+}$.

4. A lamp according to claim 1, wherein the weight percent of the red phosphor is from about 72 wt % to about 85 wt %, the weight percent of the blue phosphor is from about 10 wt % to about 20 wt %, and the weight percent of the green-blue phosphor is from about 5 wt % to about 8 wt %, based on the total weight of the phosphor blend.

5. A lamp according to claim 1, wherein the weight percent of the red phosphor is 84.2 wt %, the weight percent of the blue phosphor is 10 wt %, and the weight of the green blue phosphor is 5.8 wt %, based on the total weight of the phosphor blend.

6. A lamp according to claim 1, wherein the weight of the red phosphor is 74.9 wt %, the weight of the blue phosphor is 19.1 wt %, and the weight of the green blue phosphor is 6.0 wt %, based on the total weight of the phosphor blend.

7. A lamp according to claim 1, wherein the phosphor blend is disposed on the inner surface as a single layer coating.

8. A lamp according to claim 1, further comprising a UV reflecting barrier layer between the phosphor layer and the lamp envelope.

9. A lamp according to claim 1, wherein the phosphor blend consists of the non-rare earth red phosphor, the non-rare earth blue phosphor, and the rare earth green-blue phosphor.

10. A method comprising:
    providing a discharge tube defining an inner chamber having an inner surface and an ionizable fill disposed therein;
    providing electrodes extending into the discharge tube and operatively connected to an external power source;
    blending a mixture of particulate phosphors and preparing a suspension therefrom;
    coating the inner surface of the discharge tube with the suspension to form a phosphor blend layer; and
    energizing the ioniziable fill such that the phosphor blend is activated and white light is emitted from the discharge tube,
    wherein the phosphor blend layer comprises less than 20% rare earth-doped phosphors, based on the total weight percent of the phosphor blend, in combination with broad band non-rare earth phosphors, the phosphor blend layer including: from about 70 wt % to about 90 wt % of a non-rare earth red phosphor, from about 5 wt % to about 25 wt % of a non-rare earth blue phosphor, and from about 1 wt % to 20 wt % of a rare earth green-blue phosphor, wherein upon operation said lamp simultaneously exhibits a CRI of at least 87 and a CCT of not more than 4500K.

11. A method according to claim 10, wherein the non-rare earth red phosphor is a strontium red phosphor, wherein the non-rare earth blue phosphor is a blue halophosphor, and wherein the rare earth green-blue phosphor is $BaMgAl_{10}O_{17}: Eu^{2+}, Mn^{2+}$.

12. A method according to claim 10, wherein the weight percent of the red phosphor is 84.2 wt %, the weight percent of the blue phosphor is 10 wt %, and the weight of the green blue phosphor is 5.8 wt %, based on the total weight of the phosphor content.

13. A method according to claim 10, wherein the weight percent of the red phosphor is 74.9 wt %, the weight percent of the blue phosphor is 19.1 wt %, and the weight of the green blue phosphor is 6.0 wt %, based on the total weight of the phosphor content.

14. A method according to claim 10, wherein the phosphor blend layer is disposed on the inner surface as a single layer coating.

15. A method according to claim 10, further comprising disposing a UV reflecting barrier layer between the phosphor layer and the inner surface.

16. A phosphor system comprising less than 20 wt % rare earth phosphor in combination with at least 80 wt % broad band non-rare earth phosphors, based on the total weight percent of the phosphor content of the system, wherein the phosphor system comprises from about 70 wt % to about 90 wt % of a non-rare-earth red phosphor, from about 5 wt % to about 25 wt % of a non-rare earth blue phosphor, and from about 1 wt % to 20 wt % of a green-blue emitting phosphor.

17. A phosphor system according to claim 16, wherein the system includes less than 10 wt % $BaMgAl_{10}O_{17}:Eu^{2+}, Mn^{2+}$, and at least 90 wt % of a combination of $Sr_3(PO_4)_2:Sn^{2+}$ and $Ca_5F(PO_4)_3:Sb$.

18. A method according to claim 10 wherein the phosphor content consists of the non-rare earth red phosphor, the non-rare earth blue phosphor, and the rare earth green-blue phosphor.

19. A phosphor system according to claim 16, wherein the phosphor system consists of the non-rare earth red phosphor, the non-rare earth blue phosphor, and the rare earth green-blue phosphor.

* * * * *